US008644556B2

(12) United States Patent
Zhou et al.

(10) Patent No.: US 8,644,556 B2
(45) Date of Patent: Feb. 4, 2014

(54) IMAGE PROCESSING APPARATUS AND METHOD AND PROGRAM

(75) Inventors: Ning Zhou, Tokyo (JP); Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/276,400

(22) Filed: Oct. 19, 2011

(65) Prior Publication Data

US 2012/0106789 A1    May 3, 2012

(30) Foreign Application Priority Data

Oct. 29, 2010 (JP) ................................ 2010-243395

(51) Int. Cl.
*G06K 9/00* (2006.01)
*H04N 5/225* (2006.01)

(52) U.S. Cl.
USPC .......................................... 382/103; 348/169

(58) Field of Classification Search
USPC ......... 382/103, 107, 236, 162, 165, 181, 235, 382/276, 307; 348/154, 155, 169, 170, 171, 348/172, 352, 208.16
See application file for complete search history.

(56) References Cited

U.S. PATENT DOCUMENTS

| 6,456,728 B1 * | 9/2002 | Doi et al. ...................... 382/103 |
| 6,681,031 B2 * | 1/2004 | Cohen et al. .................. 382/103 |
| 7,298,907 B2 * | 11/2007 | Hasegawa ..................... 382/209 |
| 8,509,484 B2 * | 8/2013 | Ikenoue ........................ 382/103 |
| 2011/0239118 A1 | 9/2011 | Yamaoka et al. |

FOREIGN PATENT DOCUMENTS

JP    2002-083302    3/2002

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

An image processing apparatus includes an image input configured to receive image data, a target extraction device configured to extract an object from the image data as a target object based on recognizing a first movement by the object, and a gesture recognition device configured to issue a command based on recognizing a second movement by the target object.

17 Claims, 8 Drawing Sheets

IMAGE PROCESSING APPARATUS AND METHOD AND PROGRAM

CROSS REFERENCE TO RELATED APPLICATIONS

The present disclosure claims priority to under 35 U.S.C. §119 and contains subject matter related to that disclosed in Japanese Priority Patent Application JP 2010-243395 filed in the Japan Patent Office on Oct. 29, 2010, the entire content of which is hereby incorporated by reference.

BACKGROUND

The present technology relates to an image processing apparatus and method and a program, and particularly to an image processing apparatus and method and a program suitable for use for recognition of a gesture for operating various equipments.

In recent years, in order to implement more natural human machine interface, various investigations and development for a gesture recognition technique have been made and various techniques have been proposed (for example, refer to Japanese Patent Laid-Open No. 2002-83302). Also examples of practical use of human machine interface or motion capture such as, for example, "Eagle & Hawk Digital System" (trademark) of Motion Analysis of U.S., "MX Motion Capture" (trademark) of Vicon Peak of U.S. or the like are available.

In such various techniques as described above, a target object such as, for example, a tool for exclusive use registered in advance and worn on or held by hand by the user is tracked to recognize a gesture carried out by the user.

On the other hand, also a technique has been proposed by which, part of the body of the user such as a hand is tracked as a target object to recognize a gesture without using a specific object.

SUMMARY

However, in the case where a target object registered in advance is used, although the recognition property is enhanced, it is necessary for the user to carry out a gesture in a state in which the user wears the target object or holds the target object by hand without fail. This degrades the convenience to the user.

On the other hand, in the case where part of the body of the user is used, since the shape, color or the like of the part of the body is different among different individual persons, the recognition performance is deteriorated.

Therefore, it is desirable to provide an image processing apparatus and method and a program which enhance the performance in gesture recognition and the convenience to the user.

The present disclosure broadly includes an image processing apparatus, an image processing method, and a computer readable medium. In one embodiment, the image processing apparatus includes an image input configured to receive image data, a target extraction device configured to extract an object from the image data as a target object based on recognizing a first movement by the object, and a gesture recognition device configured to issue a command based on recognizing a second movement by the target object.

With the image processing apparatus and method and the computer readable medium, gesture recognition can be carried out using an arbitrary target object. Further, the performance in gesture recognition and the convenience to the user can be enhanced.

The above and other objects, features and advantages of the disclosed technology will become apparent from the following description and the appended claims, taken in conjunction with the accompanying drawings in which like parts or elements denoted by like reference characters.

DETAILED DESCRIPTION OF THE PREFERRED EMBODIMENT

In the following, an embodiment of the disclosed technology is described with reference to the accompanying drawings. It is to be noted that description is given in the following order.
1. Embodiment of the Disclosed Technology
2. Modification

1. Embodiment of the Disclosed Technology

Example of the Configuration of the Information Processing System

Figure 1:
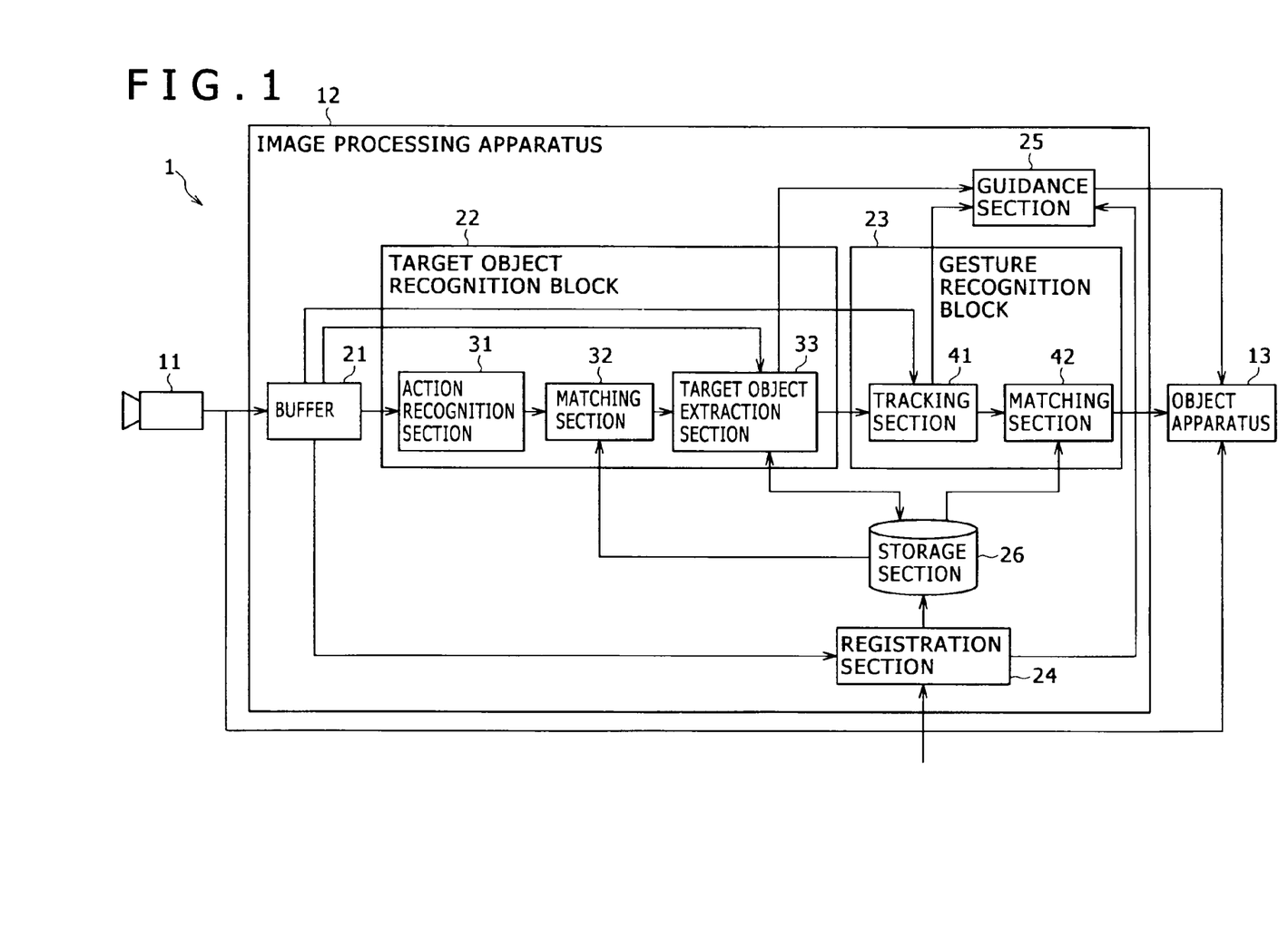
FIG. 1 is a block diagram showing an information processing system according to an embodiment of the disclosed technology.

FIG. 1 shows an information processing system according to an embodiment of the disclosed technology.

Referring to FIG. 1, the information processing system 1 shown recognizes a gesture carried out by the user and carries out a process corresponding to the recognized gesture. The information processing system 1 includes an image inputting apparatus 11, an image processing apparatus 12 and an object apparatus 13.

The image inputting apparatus 11 is configured from a video camera for which an image pickup device is used such as, for example, a CCD (Charge Coupled Device) image sensor, a CMOS (Complementary Metal Oxide Semiconductor) image sensor or the like. The image inputting apparatus 11 supplies image data (hereinafter referred to as input image data) obtained as a result of image pickup to the image processing apparatus 12.

The image processing apparatus 12 is configured from an apparatus including various processors such as, for example, a microcomputer and a storage medium, and includes a buffer 21, a target object recognition section 22, a gesture recognition block 23, a registration section 24, a guidance section 25 and a storage section 26.

The buffer 21 temporarily retains input image data supplied thereto from the image inputting apparatus 11. It is to be noted that, if the amount of input image data in the buffer 21 exceeds a predetermined amount, then the input image data are deleted successively in order beginning with the oldest data.

The target object recognition block 22 carries out recognition of a target object used for recognizing a gesture carried out by the user. The target object recognition block 22 includes an action recognition section 31, a matching section 32 and a target object extraction section 33.

The action recognition section 31 acquires input image data from the buffer 21 and extracts a moving object in the input image data to detect a characteristic amount such as, for example, a position, a moving direction, a moving distance, a speed, a rotation angle or the like of an action of the extracted moving object. Further, the action recognition section 31 generates and retains an action history which indicates a history of a characteristic amount of an action of the moving object extracted in each frame of the input image data. Further, the action recognition section 31 calculates a characteristic amount of an action of the extracted moving object till then based on the action history. The characteristic amount mentioned is hereinafter referred to as cumulative action characteristic amount. Then, the action recognition section 31 supplies the action history and the cumulative action characteristic amount of the extracted moving object to the matching section 32.

The matching section 32 carries out matching between the cumulative action characteristic amount of the extracted moving object and action data of initialization action stored in the storage section 26 to decide, based on a result of the matching, whether or not an initialization action is carried out. The action data mentioned above is hereinafter referred to as initialization action data. If it is decided that the initialization action is carried out, then the matching section 32 supplies the action history of the moving object with regard to which it is decided that the initialization action is carried out as an action history of a target object to the target object extraction section 33.

Here, the initialization action is an action for causing the image processing apparatus 12 to recognize the target object. Conversely speaking, the image processing apparatus 12 recognizes an object which carries out an initialization action in the input image data as a target object.

Further, as hereinafter described, the user can set an arbitrary action as an initialization action. For example, a simple action such as counterclockwise or clockwise rotation, leftward or rightward parallel movement, upward or downward parallel movement or the like or an action which is a combination of a plurality of kinds of simple actions can be set as an initialization action. It is to be noted that the initialization action is defined by various characteristic amounts such as, for example, a moving direction, a moving distance, a moving speed, and a rotation angle.

Further, the action data are data formed from characteristic amounts which represent an object action such as, for example, a moving direction, a moving distance, a moving speed, or a rotation angle.

The target object extraction section 33 acquires the input image data from the buffer 21 and extracts a characteristic point and a characteristic amount of the target object based on the input image data and the action history of the target object. Further, the target object extraction section 33 generates an object template configured from the characteristic point and the characteristic amount of the extracted target object. The object template mentioned above is hereinafter referred to as target object template. The target object extraction section 33 supplies the generated target object template to the tracking section 41 and stores the generated template into the storage section 26. Further, the target object extraction section 33 supplies the generated target object template or a target object template stored in the storage section 26 to the tracking section 41. Further, the target object extraction section 33 issues a notification of completion of recognition of the target object to the guidance section 25.

The gesture recognition block 23 tracks the target object in the input image data to recognize a gesture carried out by the user in order to operate the object apparatus 13, and supplies an operation signal corresponding to the recognized operation action to the object apparatus 13. The gesture is hereinafter referred to as operation action. The gesture recognition block 23 includes a tracking section 41 and a matching section 42.

It is to be noted that, as hereinafter described, the user can set an arbitrary action as an operation action similarly to the initialization action. Further, similarly to the initialization action, the operation action can be defined by various characteristic amounts such as, for example, a moving direction, a moving distance, a moving speed, a rotation angle and so forth.

The tracking section 41 acquires input image data from the buffer 21 and tracks the movement of a target object in the input image data based on a target object template supplied thereto from the target object extraction section 33. The tracking section 41 generates and retains an action history of the target object based on a result of the tracking. Further, the tracking section 41 calculates a cumulative action characteristic amount of the target object based on the action history of the target object and supplies a result of the calculation to the matching section 42. Further, the tracking section 41 issues a notification of presence or absence of registration of the target object, the result of the tracking of the target object and so forth to the guidance section 25.

The matching section 42 carries out matching between the cumulative action characteristic amount of the target object and action data of operation actions stored in the storage section 26 and decides, based on a result of the matching, whether or not the operation action is carried out. The action data mentioned is hereinafter referred to as operation action data. If it is decided that the operation action is carried out, then the matching section 42 outputs an operation signal corresponding to the operation action.

The registration section 24 acquires input image data from the buffer 21 and registers an initialization action and an operation action based on the input image data and an instruction from the user inputted through an inputting apparatus not shown. More particularly, the registration section 24 generates initialization action data and operation action data based on the input image data and the instruction from the user and stores the generated data into the storage section 26. Further, the registration section 24 issues an instruction to the guidance section 25 to execute guidance when an initialization action or an operation action is registered.

The guidance section 25 issues an instruction to the object apparatus 13 to execute various kinds of guidance for using the image processing apparatus 12 to cause the object apparatus 13 to execute the guidance.

The storage section 26 is configured from a nonvolatile storage medium such as, for example, an EEPROM or a hard disk drive. The storage section 26 stores a target object template, initialization action data and operation action data. It is to be noted that, in the storage section 26, initialization values of the initialization action data and the operation action data are stored in advance. In particular, default actions (gestures) are registered in advance as an initialization action and operation actions for operating the object apparatus 13.

The target apparatus 13 is not limited to a specific apparatus and is configured from an apparatus to which an operation by gesture recognition can be applied such as, for example, a personal computer, a television receiver, various video recorders, a video player and so forth. The object apparatus 13 executes a process corresponding to the operation signal supplied thereto from the matching section 42.

It is to be noted that, in the following description, it is assumed that the object apparatus 13 includes a display apparatus such as an LCD (Liquid Crystal Display) apparatus.

Gesture Recognition Process

Now, a gesture recognition process executed by the information processing system 1 is described with reference to a flow chart of FIG. 2. It is to be noted that the process is started, for example, when power supply to the information processing system 1 is switched on, but is ended when the power supply to the information processing system 1 is switched off.

It is to be noted that, together with starting of the gesture recognition process, image pickup by the image inputting apparatus 11 is started and input image data obtained as a result of the image pickup are successively supplied to and temporarily retained into the buffer 21. Further, if the stored amount of the input image data in the buffer 21 exceeds a predetermined amount, then the input image data are successively deleted in order beginning with the oldest data.

Figure 8:
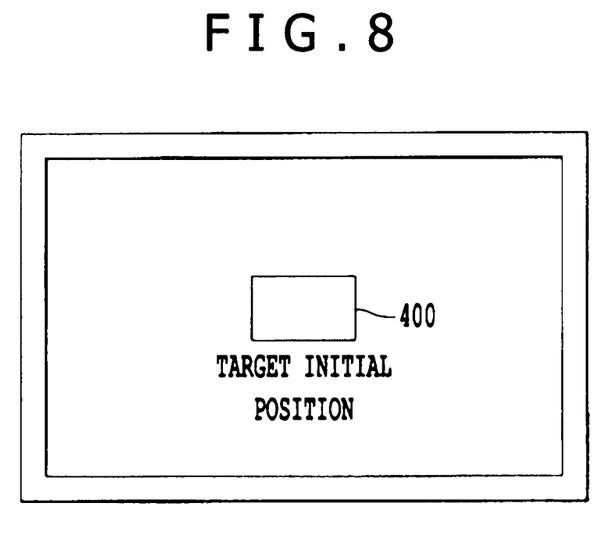
FIG. 8 illustrates a display displaying target initial position registration guidance information.
Figure 9:
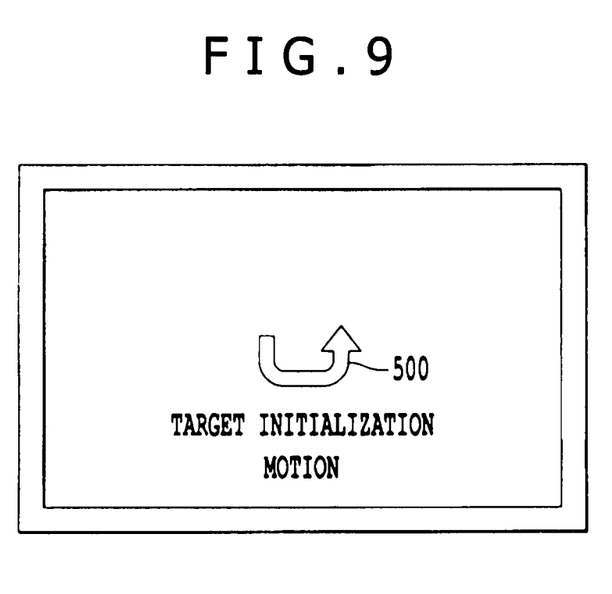
FIG. 9 illustrates a display displaying target initialization motion registration guidance information.

At step S1, the object apparatus 13 carries out guidance for registration of a target object under the control of the guidance section 25. For example, the object apparatus 13 acquires input image data from the image inputting apparatus 11 and displays an image based on the input image data. Further, the object apparatus 13 displays a message for urging registration of a target object, a framework which indicates a rough estimate of an initial position of a target object, an arrow mark for guiding an initialization action for allowing a target object to be recognized and so forth on the displayed image. Thus, a display can provide this initial registration guidance information, as shown in FIGS. 8 and 9. In this regard, FIG. 8 shows the display displaying target initial position 400 as initial registration guidance information. FIG. 9 shows the display displaying arrow 500 which provides the target initialization motion. Then, in accordance with the guidance, the user would set an object to the guided initial position, for example, in a state in which an object to be set as a target object is held by hand or is mounted on a hand, and then moves the hand to carry out an initialization action of the object.

It is to be noted that the initial position is set for allowing the target object to be recognized more quickly and need not necessarily be provided.

Further, the guidance for registration of a target object need not always be carried out and can be omitted.

At step S2, the action recognition section 31 acquires input image data former by the latest and second latest input image data from the buffer 21.

At step S3, the action recognition section 31 executes an action recognition process. Here, details of the action recognition process are described with reference to a flow chart of FIG. 3.

Figure 3:
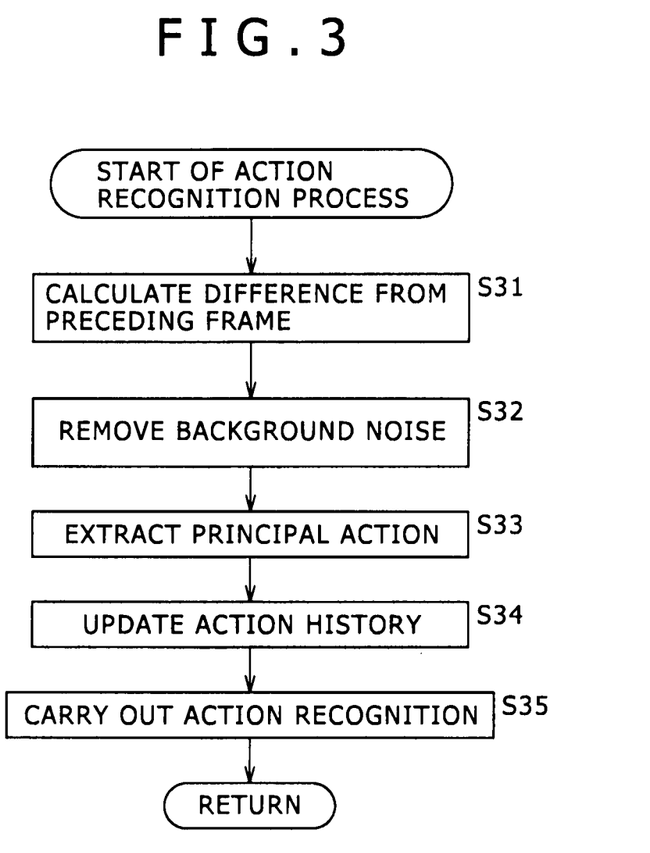
FIG. 3 is a flow chart illustrating details of an action recognition process.

At step S31, the action recognition section 31 calculates a difference between the frames. In particular, the action recognition section 31 calculates a difference value between pixel values of pixels at the same position between the input image data of the latest frame and the input image data of the second latest frame acquired from the buffer 21 and generates difference image data between them.

At step S32, the action recognition section 31 carries out various filter processes for the difference image data to remove background noise of the difference image data.

At step S33, the action recognition section 31 extracts a main action. In particular, the action recognition section 31 extracts a main moving object in the input image data based on the difference image data whose noise is removed and detects a characteristic amount of an action of the extracted moving object. It is to be noted that, in the case where a plurality of main moving bodies exist, the action recognition section 31 detects a characteristic amount of an action of each moving object.

It is to be noted that an arbitrary technique can be adopted for the extraction process of a main action. For example, a technique disclosed in Yokoyama, M. and T. Poggio, "A Contour-Based Moving Object Detection and Tracking", In: Proceedings of Second Joint IEEE International Workshop on Visual Surveillance and Performance Evaluation of Tracking and Surveillance (in conjunction with ICCV 2005), pp. 271-276, October 2005 can be adopted.

Further, in the case where the image pickup position of the image inputting apparatus 11 is fixed and variation of the background is little, a background differential method or the like can be applied.

At step S34, the action recognition section 31 updates an action history. For example, the action recognition section 31 selects one of moving bodies (such moving object is hereinafter referred to as pertaining moving object) extracted by the process at step S33 to detect, based on the retained action history, a moving object whose distance to the certain moving object is within a predetermined range and is placed at the nearest position to the pertaining moving object from among the moving bodies extracted in the action recognition process in the preceding operation cycle. Then, the action recognition section 31 adds the characteristic amount of the action of the pertaining moving object detected by the process at step S33 to the history of the action of the detected moving object to update the action history. Then, the action recognition section 31 carries out the process described for all of the moving bodies extracted by the process at step S33 in the present operation cycle.

Further, in the case where the moving bodies extracted by the action recognition process in the immediately preceding cycle do not include a moving object whose distance to the certain moving object is within the predetermined range, the action recognition section 31 adds the pertaining moving object as a new moving object to the action history.

It is to be noted that, at this time, data at a time preceding the present time by more than a predetermined time may be deleted from the action history.

At step S35, the action recognition section 31 carries out action recognition. In particular, the action recognition section 31 calculates a cumulative action characteristic amount from a point in time preceding the present time by a predetermined time, that is, by a predetermined number of frames, to a present point in time based on the action history for the moving bodies extracted by the process at step S33. The action recognition section 31 supplies the action history and the cumulative action characteristic amounts of the moving bodies to the matching section 32.

It is to be noted that, at this time, the cumulative action characteristic amount from a point in time at which a moving object is detected for the first time to a present point in time may be calculated regarding each moving object without setting a limit to time.

Figure 2:
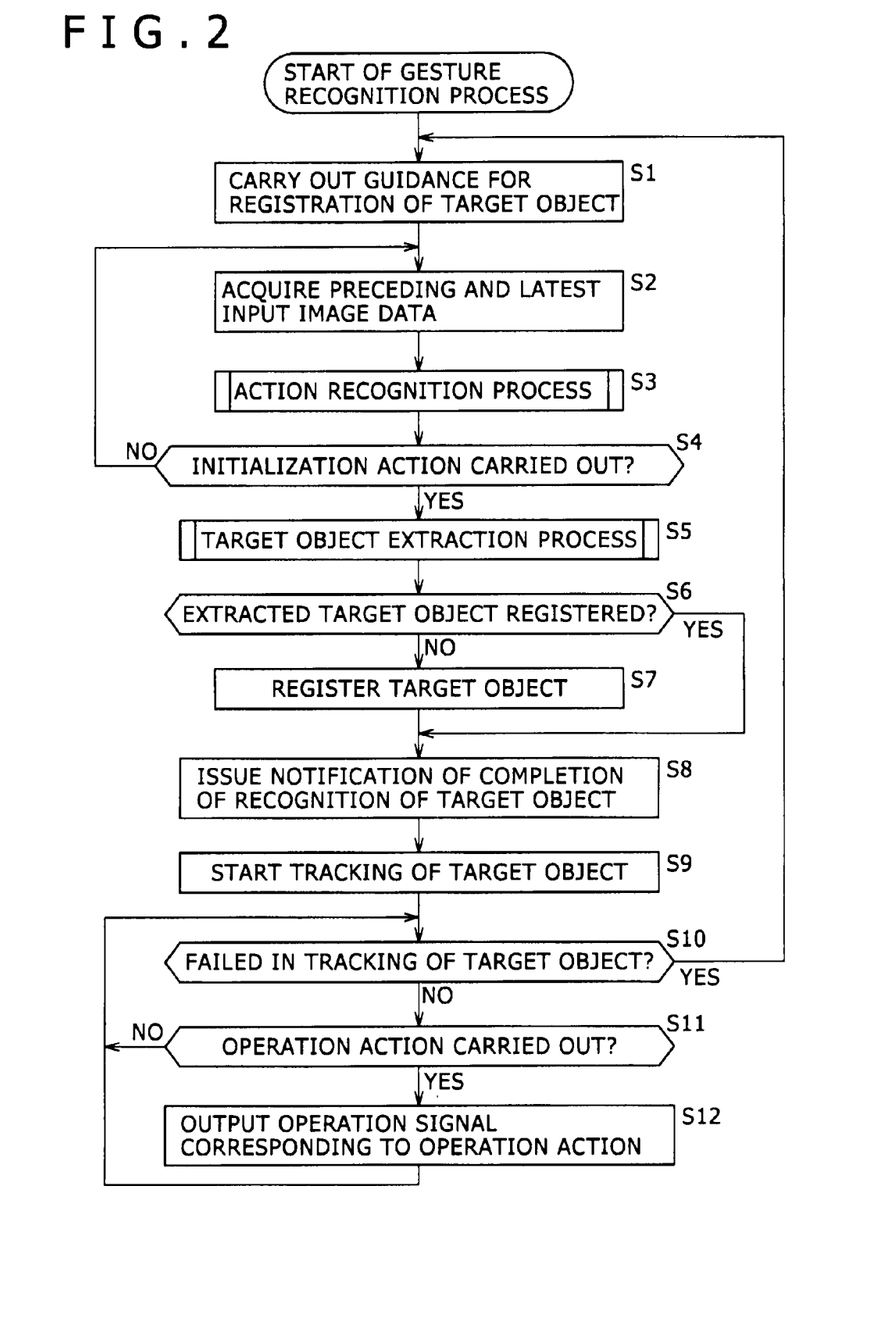
FIG. 2 is a flow chart illustrating a gesture recognition process.

Thereafter, the action recognition process is ended and the processing advances to step S4 of FIG. 2.

At step S4, the matching section 32 decides whether or not an initialization action is carried out. In particular, the matching section 32 reads out the initialization action data from the storage section 26 and carries out matching between the read out data and the cumulative action characteristic amount of each moving object detected by the action recognition section 31. As a result, if a moving object having a cumulative action characteristic amount whose difference from the initialization action data is within the predetermined range is not detected, then the matching section 32 decides that an initialization action is not carried out and the processing returns to step S2.

It is to be noted that an arbitrary technique such as, for example, an HMM (Hidden Markov Model) method, a Neural Network method or the like can be adopted for the matching carried out at this time.

Thereafter, the processes from step S2 to step S4 are repetitively executed in synchronism with supplying of input image data from the image inputting apparatus 11 to the buffer 21 until it is decided at step S4 that an initialization action is carried out.

On the other hand, if a moving object having a cumulative action characteristic amount whose difference from the initialization action data is within the predetermined range is detected at step S4, then the matching section 32 decides that an initialization action is carried out and the processing advances to step S5.

At step S5, the target object extraction section 33 executes a target object extraction process. Here, details of the target object extraction process are described with reference to a flow chart of FIG. 4.

Figure 4:
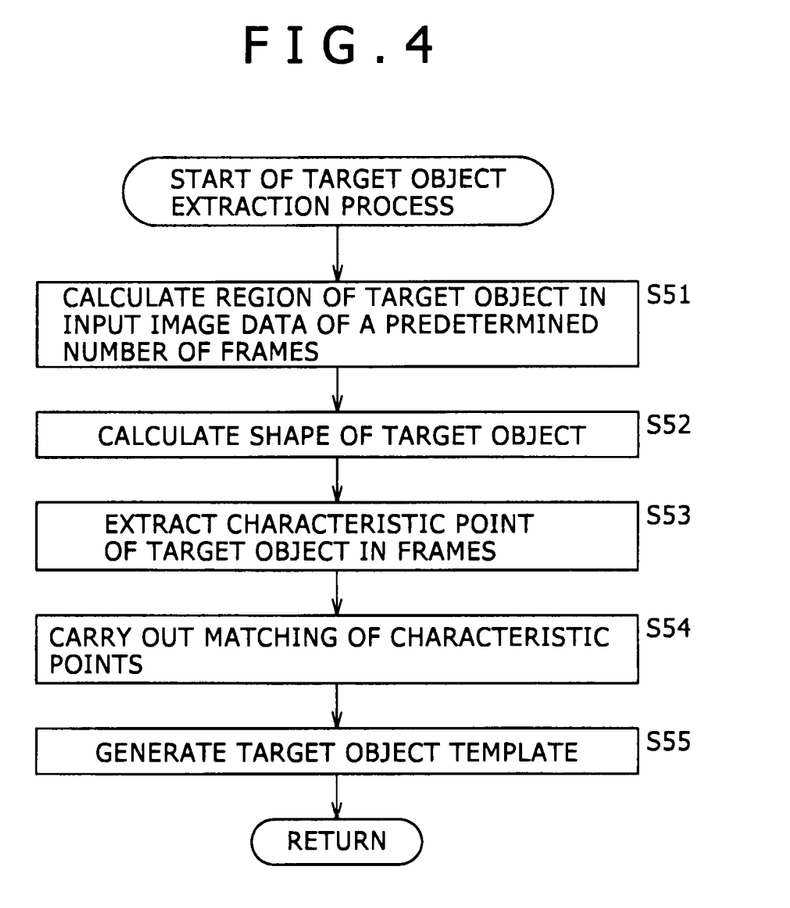
FIG. 4 is a flow chart illustrating details of a target object extraction process.

At step S51, the target object extraction section 33 calculates a region of a target object in the input image data having a predetermined number of frames. In particular, the matching section 32 supplies the action history of the moving object whose difference is smallest from among the moving bodies individually having cumulative action characteristic amounts whose difference from the initialization action data is within the predetermined range as the action history of the target object to the target object extraction section 33. The target object extraction section 33 acquires the input image data from the latest input image data to the input image data of the frame preceding the present time by a predetermined number of frames from the buffer 21. Then, the target object extraction section 33 calculates a region of the target object in each frame of the acquired input image data based on the action history of the target object.

At step S52, the target object extraction section 33 calculates a shape of the target object. In particular, the target object extraction section 33 carries out matching of the region of the target object in each frame of the input image data calculated by the process at step S51 to calculate the shape of the target object.

At step S53, the target object extraction section 33 extracts a characteristic point of the target object in each frame. In particular, the target object extraction section 33 applies the shape of the target object calculated by the process at step S52 to the region of the target object in each frame of the input image data calculated by the process at step S51. Then, the target object extraction section 33 extracts a characteristic point in the region of the target object of each frame of the input image data.

It is to be noted that, at this time, a characteristic point may be extracted based on one kind of characteristic amount or may be extracted based on a plurality of kinds of characteristic amounts. Also as a technique for extracting a characteristic point, an arbitrary technique can be adopted such as, for example, a local region histogram or Scale-Invariant Feature Transform (SIFT).

At step S54, the target object extraction section 33 carries out matching of a characteristic point of the target object extracted in each frame. It is to be noted that the distance function to be used for the matching is not limited to a specific one, but a suitable function may be applied in response to the kind of the characteristic amount.

At step S55, the target object extraction section 33 generates a target object template. For example, the target object extraction section 33 determines an average value of characteristic amounts of the characteristic points determined as corresponding to each other in each frame based on a result of the matching process at step S54. Then, the target object extraction section 33 generates a target object template including the characteristic points of the target object and the calculated average of the characteristic amount.

Figure 5:
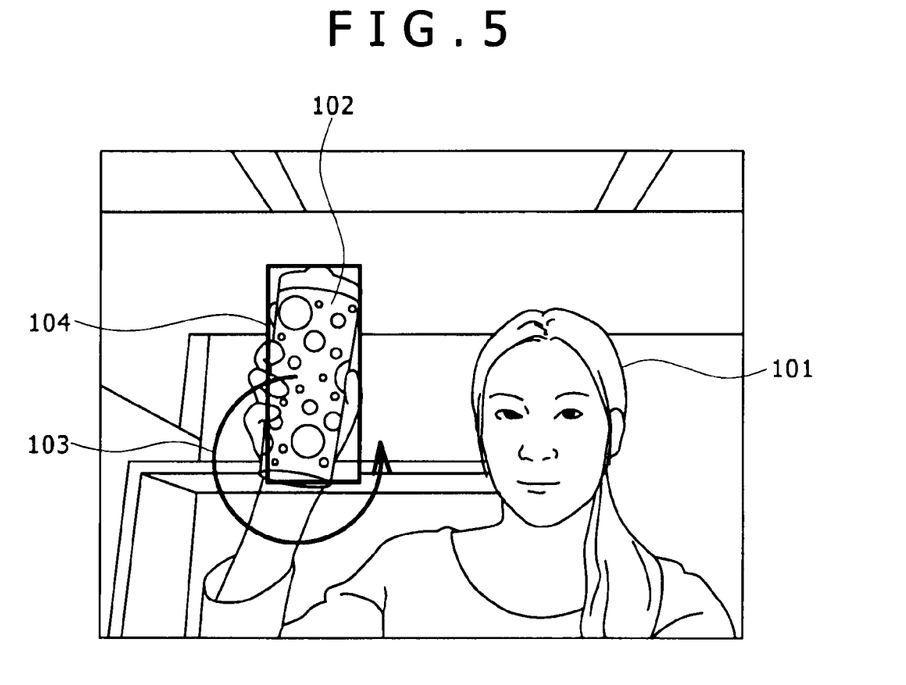
FIG. 5 is a schematic view illustrating a particular example of a process for recognizing a target object.

Consequently, for example, if the user 101 rotates a cup 102 held by a hand thereof in the direction of an arrow mark 103 as seen in FIG. 5 and the rotating action in the direction of the arrow mark 103 is an initialization operation, then the cup 102 is recognized as a target object. Further, a target object template indicative of characteristic points and characteristic amounts in a rectangular region 104 of a size substantially equal to that of the cup 102 is generated.

Thereafter, the target object extraction process comes to an end, and the processing advances to step S6 of FIG. 2.

At step S6, the target object extraction section 33 decides whether or not the target object extracted by the process at step S5 is registered. In particular, if no target object template is stored in the storage section 26, then the target object extraction section 33 decides that the extracted target object is not registered, and advances the processing to step S7.

On the other hand, if a target object template or templates are stored in the storage section 26, then the target object extraction section 33 compares the target object template generated by the process at step S55 and the target object template or templates stored in the storage section 26. Then, if a target object template whose difference from the generated target object template is within a predetermined range is not stored in the storage section 26, then the target object extraction section 33 decides that the extracted target object is not registered, and advances the processing to step S7.

At step S7, the target object extraction section 33 registers the target object. In particular, the target object extraction section 33 stores the target object template generated by the process at step S5 into the storage section 26.

On the other hand, if a target object template whose difference from the target object template generated by the process at step S55 is stored in the storage section 26 at step S6, then the target object extraction section 33 decides that the extracted target object is registered already. Consequently, the target object extraction section 33 advances the processing to step S8 skipping the process at step S7. It is to be noted that, at this time, the target object extraction section 33 may update the target object template stored in the storage section 26 with the newly generated target object template.

At step S8, the object apparatus 13 issues a notification of completion of recognition of a target object under the control of the guidance section 25. More particularly, the target object extraction section 33 notifies the guidance section 25 of the completion of recognition of a target object. The guidance section 25 issues an instruction to the object apparatus 13 to execute notification of the completion of recognition of a target object.

For example, the object apparatus 13 displays, on an image based on input image data, a framework representative of a region of the recognized target object like the framework of the region 104 of FIG. 5 thereby to notify the user that the recognition of a target object is completed and of the recognized target object.

In this manner, the user can simply set an arbitrary substance as a target object. Also it is possible to set part of the body of the user itself such as, for example, a hand, an arm, the head or a foot or the entire body of the user as a target object.

It is to be noted that, in order to enhance the recognition performance, preferably a substance which exhibits a variation of an appearance such as the shape, color or brightness as small as possible as a target object. Further, in the case where part of the body is set as a target object, when gesture recognition is carried out, it is preferable to move the target object such that the shape of the same exhibits a variation as small as possible.

At step S9, the image processing apparatus 12 starts tracking of the target object. In particular, the target object extraction section 33 first supplies the object template of the recognized target object, that is, the target object template, to the tracking section 41. It is to be noted that, at this time, in the case where the extracted target object is registered already, one of the target object template stored in the storage section 26 and the target object template generated newly by the process at step S55 may be supplied to the tracking section 41.

The tracking section 41 carries out the following process in synchronism with supply of input image data from the image inputting apparatus 11 to the buffer 21. In particular, the tracking section 41 acquires new input image data from the buffer 21 and searches for the target object in the latest input image data based on the target object template. Then, the tracking section 41 updates the action history of the target object based on a result of the search.

Further, the tracking section 41 calculates an accumulate action characteristic amount of the target object from a point in time preceding by a predetermined period of time, that is, preceding by a predetermined number of frames, to the present point in time. The tracking section 41 supplies the accumulated action characteristic amount of the target object to the matching section 42.

At step S10, the tracking section 41 decides whether or not the tracking of the target object results in failure. In the case where the target object can be detected from among the input image data or the period of time within which the target object cannot be detected is within a predetermined period of time, that is, within a predetermined number of frames, the tracking section 41 decides that it does not fail in the tracking of the target object and advances the processing to step S11.

At step S11, the matching section 42 decides whether or not an operation action is carried out. In particular, the matching section 42 uses a technique similar to that used by the matching section 32 to carry out matching between the operation action data stored in the storage section 26 and the cumulative action characteristic amount of the target object. If the operation action data the difference of which from the cumulative action characteristic amount of the target object remains within the predetermined range cannot be detected, then the matching section 42 decides that an operation action is not carried out and returns the processing step S10.

Thereafter, the processes at steps S10 and S11 are executed repetitively until after it is detected at step S10 that the tracking of the target object results in failure or it is decided at step S11 that an operation action is carried out.

On the other hand, if it is decided at step S11 that operation action data the difference of which from the cumulative action characteristic amount of the target object remains within the predetermined range is detected, then the matching section 42 decides that an operation action is carried out and advances the processing to step S12.

At step S12, the matching section 42 outputs an operation signal corresponding to the operation action. In particular, the matching section 42 supplies an operation signal corresponding to the operation action data which exhibits the smallest difference from the cumulative action characteristic amount of the target object to the object apparatus 13. Then, the object apparatus 13 executes a process corresponding to the operation action carried out by the user in accordance with the acquired operation signal.

Thereafter, the processing returns to step S10 so that the processes at the steps beginning with step S10 are executed.

On the other hand, if the period within which no target object is detected exceeds the predetermined time, then the tracking section 41 decides at step S10 that the tracking of the target object results in failure and returns the processing to step S1. Thereafter, the processes at the steps beginning with step S1 are executed, and consequently, it is possible to re-set or change the target object.

In this manner, it is possible to set an arbitrary substance as a target object simply and carry out an operation of the object apparatus 13 based on gesture recognition. Accordingly, it is not necessary to register a target object in advance. Further, it is possible to set, for example, a familiar or closely located object, which can be used readily by the user, as a target object, and this enhances the convenience to the user. Further, since there is no necessity to prepare a tool for exclusive use which is used as a target object, development, for example, to appliances for general homes is facilitated.

Further, since the body of the user can be set partly or entirely as a target object, the convenience to the user is further enhanced.

Furthermore, since it is possible to re-set or change the target object simply, even if an environmental situation such as, for example, the brightness changes, if the target object is re-set, then the degradation of the tracking accuracy of the target object can be suppressed to enhance the performance in gesture recognition.

Registration Process of an Action Pattern

Figure 6:
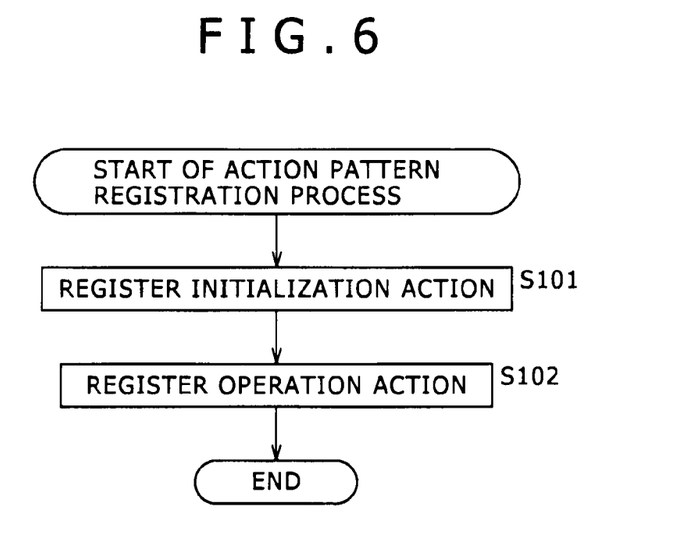
FIG. 6 is a flow chart illustrating an action pattern registration process.

Now, an action pattern registration process executed by the information processing system 1 is described with reference to a flow chart of FIG. 6. It is to be noted that this process is started, for example, when the user carries out a predetermined operation during execution of the gesture recognition process.

First at step S101, the registration section 24 registers an initialization action. In particular, the registration section 24 issues an instruction to execute the guidance for registration of an initialization action to the guidance section 25. The guidance section 25 issues an instruction to the object apparatus 13 so that the object apparatus 13 executes guidance for registration of an initialization action. The user would carry out registration of an initialization action in accordance with the guidance, and the registration section 24 stores action data corresponding to the registered initialization action, that is, initialization action data, into the storage section 26.

At step S102, the registration section 24 registers the operation action. In particular, the registration section 24 issues an instruction to execute the guidance for registration of an operation action to the guidance section 25. The guidance section 25 issues an instruction to the object apparatus 13 so that the object apparatus 13 executes the guidance for registration of an operation action. The user would carry out registration of an operation action in accordance with the guidance, and the registration section 24 stores action data corresponding to the registered operation action, that is, operation action data, into the storage section 26.

Thereafter, the action pattern registration process ends.

It is to be noted that the processes at steps S101 and S102 may otherwise be carried out in the reverse order. Or, the initialization action and the operation action may be registered in an arbitrary order.

Further, the registration method of the initialization action and the operation action is not limited to the particular method, but an arbitrary method may be adopted.

Figure 10:
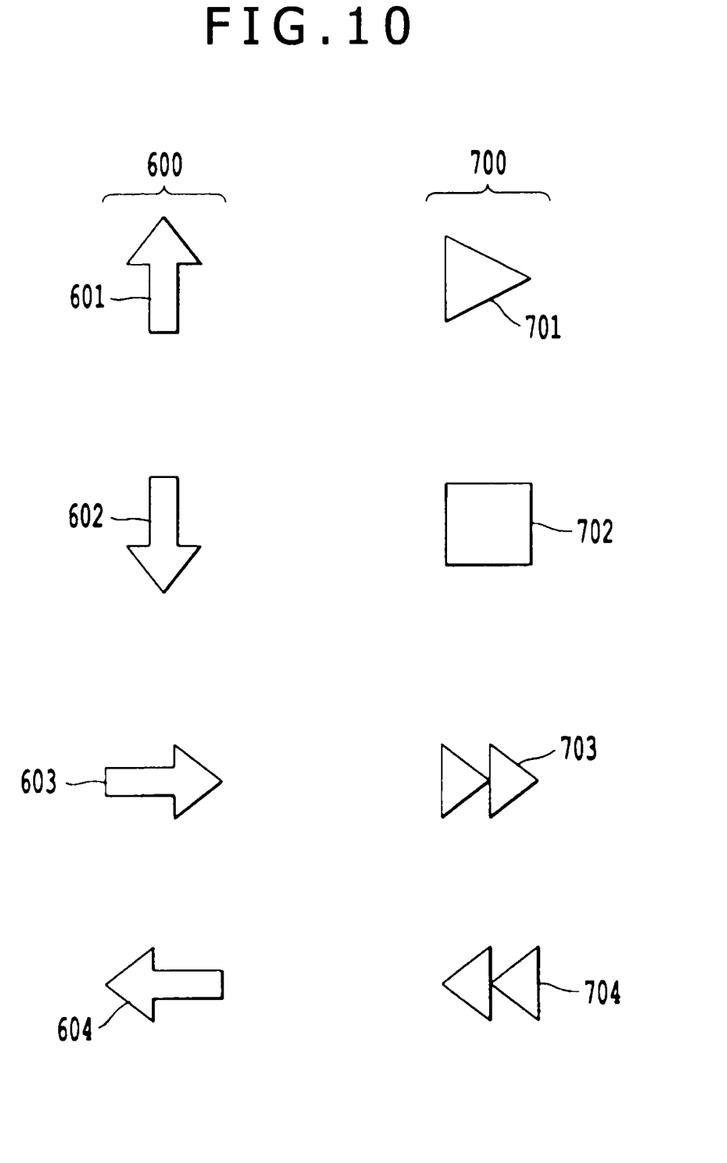
FIG. 10 illustrates a plurality of commands and corresponding movements.

For example, as shown in FIG. 10, a table which indicates a plurality of action patterns 200 registered in advance by an arrow mark or the like may be displayed on a display apparatus of the object apparatus 13 such that an action pattern to be applied to the initialization action and each operation action can be selected by the user. Thus a user can select the preferred actions from among a preprogrammed actions to be the initialization action and each operation action. In FIG. 10, a user has selected actions 600 to correspond to commands 700. In this regard, a user could select up arrow 601 to correspond to a play command 701, down arrow 602 to correspond to stop command 702, right arrow 603 to correspond to fast forward command 703, and left arrow 604 to correspond to rewind command 704.

Or, for example, a screen image for drawing may be displayed on a display apparatus of the object apparatus 13 such that the user uses an inputting apparatus not shown such as a mouse to draw an action pattern or a locus of action to be applied to an initialization action or each operation action. In this instance, for example, action data corresponding to the drawn action pattern is generated and stored into the storage section 26. In this case, the user can customize their own unique actions for the initialization action and each operation action. Thus, the actions 600 in FIG. 10 could be entered by a user to correspond to commands 700.

Further, for example, an action to be applied to an initialization action or each operation action may be caused to be actually executed by the user in front of the image inputting apparatus 11. In this instance, the action of the user is extracted, for example, based on input image data obtained by image pickup, and action data corresponding to the extracted action is produced and stored into the storage section 26.

An arbitrary action pattern can be registered as an initialization action and an operation action in this manner, and the convenience to the user is further enhanced.

2. Modifications

It is to be noted that the various methods for guidance described above are mere examples, and the guidance may be carried out by some other method. For example, if the object apparatus 13 does not include a display apparatus, then the guidance may be carried out, for example, by speech or light. Also in the case where the object apparatus 13 includes a display apparatus, an image, speech, light and so forth may be combined to carry out guidance.

Further, the guidance section 25 may include a display apparatus, a sound outputting apparatus, a light emitting apparatus or the like such that the guidance section 25 itself carries out guidance.

Further, while, in FIG. 1, the object apparatus 13, image inputting apparatus 11 and image processing apparatus 12 are formed as separate apparatus from each other, for example, the object apparatus 13 may have both or one of the image inputting apparatus 11 and the information processing system 1 built therein.

Furthermore, where an article different from the body of the user is set as a target object, the user may hold the target object by hand or may carry the target object thereon.

Further, while, in the foregoing description, when an operation action is recognized, a corresponding operation signal is outputted, for example, when an operation action cannot be recognized, a signal representation that no pertaining operation exists may be outputted.

Further, there is no necessity for the user to be able to register an initialization action and an operation action, and default actions registered in advance may be used. Or only one of an initialization action and an operation action may be able to be registered by the user.

Further, in the case where a target object template is stored in the storage section 26, a recognition process of the target object based on the target object template may be carried out in parallel to the recognition process of the target object by the initialization action. Then, for example, if the target object recognition block 22 detects an article whose difference from the target object template stored in the storage section 26 remains within a predetermined range from within the input image data before an initialization action is carried out, then the article may be set as the target object. This makes it possible to re-use a target object registered already without carrying out an initialization action.

Example of the Configuration of the Computer

While the series of processes described above can be executed by hardware, it may otherwise be executed by software. Where the series of processes is executed by software, a program which constructs the software is installed into a computer. Here, the computer may be a computer incorporated in hardware for exclusive use or, for example, a personal computer for universal use which can execute various functions by installing various programs.

Figure 7:
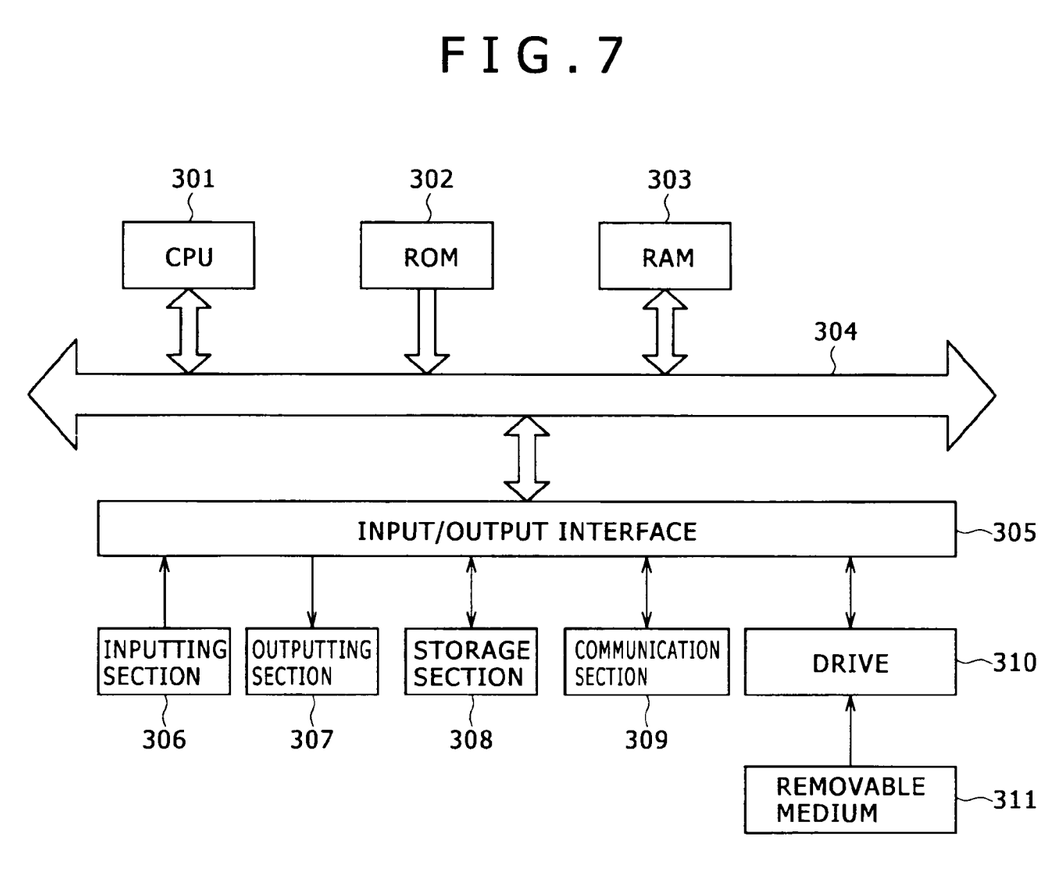
FIG. 7 is a block diagram showing an example of a configuration of a computer.

FIG. 7 shows an example of a configuration of hardware of a computer which executes the series of processes described hereinabove in accordance with a program.

Referring to FIG. 7, the computer shown includes a central processing unit (CPU) 301, a read only memory (ROM) 302 and a random access memory (RAM) 303 which are connected to each other by a bus 304.

Further, an input/output interface 305 is connected to the bus 304. An inputting section 306, an outputting section 307, a storage section 308, a communication section 309 and a drive 310 are connected to the input/output interface 305.

The inputting section 306 includes a keyboard, a mouse, a microphone and so forth. The outputting section 307 includes a display unit, a speaker and so forth. The storage section 308 includes: a hard disk, a nonvolatile memory or the like. The communication section 309 includes a network interface and so forth. The drive 310 drives a removable medium 311 such as a magnetic disk, an optical disk, a magneto-optical disk or a semiconductor memory.

In the computer configured in such a manner as described above, the CPU 301 loads a program, for example, stored in the storage section 308 into the RAM 303 through the input/output interface 305 and the bus 304 and executes the program to carry out the series of processes described hereinabove.

The program executed by the computer or the CPU 301 can be recorded into and provided as a removable medium 311 such as, for example, a package medium. Further, the program may be provided through a wire or wireless transmission medium such as a local area network, the Internet or a digital satellite broadcast.

In the computer, the program can be installed into the storage section 308 through the input/output interface 305 by loading the removable medium 311 into the drive 310. Or, the program may be received by the communication section 309 through a wire or wireless transmission medium and installed into the storage section 308. Or else, the program may be installed in advance in the ROM 302 or the storage section 308.

It is to be noted that the program executed by the computer may be a program whose processes are carried out in a time series in the order described in the present specification or are carried out in parallel or else are carried out at a necessary timing such as when the program is called.

Further, in the present specification, the term system is used to signify a general apparatus configured from a plurality of apparatus, measures and so forth.

While a preferred embodiment of the disclosed technology has been described using specific terms, such description is for illustrative purposes only, and it is to be understood that changes and variations may be made without departing from the spirit or scope of the following claims.

What is claimed is:

1. An image processing apparatus comprising:
    an image input configured to receive image data;
    a target extraction device configured to extract an object from the image data as a target object based on recognizing a first movement by the object;
    a gesture recognition device configured to issue a command based on recognizing a second movement by the target object; and
    a display control device configured to control a display device to display notification information after the target extraction device extracts the target object.

2. The apparatus according to claim 1, wherein the display control device controls the display device to display notification information including an image of a shape of the target object determined by the target extraction device.

3. The apparatus according to claim 2, wherein the target extraction device creates a template for the target object, the template including an average value of characteristic amounts of characteristic points of the target object.

4. The apparatus according to claim 3, wherein the target extraction device determines the shape of the target object based on the template for the target object.

5. The apparatus according to claim 3, wherein the display control device controls the display device to display initial registration guidance information before the target extraction device extracts the target object.

6. The apparatus according claim 5, wherein the display control device controls the display device to display an initial position of the target object as the initial registration guidance information.

7. The apparatus according claim 5, wherein the display control device controls the display device to display an arrow showing the first movement as the initial registration guidance information.

8. The apparatus according to claim 1, wherein the gesture recognition device is configured to issue a plurality of commands, each command corresponding to a different movement by the target object, the gesture recognition device issuing each command after the corresponding movement by the target object is recognized from the image data.

9. The apparatus according claim 8, wherein the display control device controls the display device to display arrows showing the corresponding movement for each of the plurality of commands.

10. The apparatus according to claim 9, wherein the gesture recognition device receives a plurality of input movements from a user and sets the plurality of input movements to be corresponding movements for the plurality of commands.

11. The apparatus according to claim 1, wherein the gesture recognition device receives an input movement from a user and sets the input movement to be the first movement.

12. The apparatus according to claim 1, wherein the gesture recognition device receives an input movement from a user and sets the input movement to be the second movement.

13. The apparatus according to claim 1, wherein the target extraction device selecting an object that moves in a counter-clockwise direction as the target object.

14. The apparatus according to claim 1, wherein the target extraction device selects a part of a body of a user as the target object.

15. The apparatus according to claim 1, wherein the target extraction device calculates a difference between a plurality of image frames to extract the target object.

16. An image processing method comprising:
    receiving image data;
    extracting an object from the image data as a target object based on recognizing a first movement by the object;
    issuing a command based on recognizing a second movement by the target object; and
    controlling a display device to display notification information after the extracting extracts the target object.

17. A non-transitory computer readable medium encoded with a computer program that, when loaded on a processor, causes the processor to execute an image processing method comprising:
    receiving image data;
    extracting an object from the image data as a target object based on recognizing a first movement by the object;
    issuing a command based on recognizing a second movement by the target object; and
    controlling a display device to display notification information after the extracting extracts the target object.

* * * * *